US008930010B2

(12) United States Patent
Hanses et al.

(10) Patent No.: US 8,930,010 B2
(45) Date of Patent: Jan. 6, 2015

(54) INTELLIGENT ASSEMBLY SYSTEM AND METHOD OF USE

(75) Inventors: Philip C. Hanses, East Lansing, MI (US); Michael A. Drago, Novi, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1770 days.

(21) Appl. No.: 11/671,358

(22) Filed: Feb. 5, 2007

(65) Prior Publication Data
US 2008/0103622 A1 May 1, 2008

Related U.S. Application Data

(63) Continuation-in-part of application No. 11/555,141, filed on Oct. 31, 2006, now abandoned.

(60) Provisional application No. 60/882,881, filed on Dec. 29, 2006.

(51) Int. Cl.
*G06F 19/00* (2011.01)
*G05B 19/418* (2006.01)
*G06Q 10/06* (2012.01)

(52) U.S. Cl.
CPC ............ *G05B 19/4183* (2013.01); *G06Q 10/06* (2013.01); *G05B 2219/31044* (2013.01); *G05B 2219/33199* (2013.01)
USPC .......................................... 700/115; 700/116

(58) Field of Classification Search
USPC ...................... 700/115, 116, 95; 235/375, 376
See application file for complete search history.

(56) References Cited

U.S. PATENT DOCUMENTS

| 5,056,028 | A | 10/1991 | Ohta et al. .................... 364/468 |
| 5,635,693 | A | 6/1997 | Benson et al. |
| 6,032,861 | A | 3/2000 | Lemelson et al. ............ 235/456 |
| 6,246,919 | B1 | 6/2001 | Hassel |
| 6,381,509 | B1 * | 4/2002 | Thiel et al. .................... 700/115 |
| 6,725,116 | B2 * | 4/2004 | Sanada et al. ................. 700/115 |
| 6,839,604 | B2 * | 1/2005 | Godfrey et al. ............... 700/116 |
| 7,069,100 | B2 | 6/2006 | Monette et al. |
| 7,093,756 | B2 | 8/2006 | Muehl et al. |
| 7,099,728 | B2 | 8/2006 | Urabe |
| 7,103,433 | B1 * | 9/2006 | Yuan et al. ...................... 700/95 |
| 7,200,466 | B2 | 4/2007 | Honda |
| 7,259,675 | B2 | 8/2007 | Baker et al. |

(Continued)

FOREIGN PATENT DOCUMENTS

DE 4415763 A1 11/1995

OTHER PUBLICATIONS

International Search Report and Written Opinion for International Application No. PCT/US07/80417 mailed Nov. 7, 2008 (8 pages).

(Continued)

*Primary Examiner* — Sean Shechtman
*Assistant Examiner* — Steven Garland
(74) *Attorney, Agent, or Firm* — Fish & Richardson P.C.; Spencer Chase Patterson

(57) ABSTRACT

A manufacturing system and method for manufacturing a product include storing product-related information with the product. The product-related information may be stored on one or more tags secured to a portion of the product and may be used to facilitate or control an aspect of manufacturing. During manufacturing, product-related information may be updated, for example, to reflect completion of a manufacturing operation.

26 Claims, 6 Drawing Sheets

(56) References Cited

U.S. PATENT DOCUMENTS

| | | |
|---|---|---|
| 7,304,573 B2 | 12/2007 | Postma |
| 7,340,319 B2 | 3/2008 | Hawman et al. |
| 2003/0158795 A1 | 8/2003 | Markham et al. |
| 2004/0024570 A1 | 2/2004 | Muehl et al. |
| 2004/0084520 A1* | 5/2004 | Muehl et al. ............. 235/376 |
| 2004/0102865 A1 | 5/2004 | Heusermann et al. |
| 2004/0162628 A1 | 8/2004 | Mori |
| 2005/0113949 A1 | 5/2005 | Honda |
| 2005/0143883 A1 | 6/2005 | Yamagiwa |
| 2005/0228528 A1* | 10/2005 | Farchmin et al. ............ 700/116 |
| 2005/0240610 A1 | 10/2005 | Tani et al. |
| 2006/0200261 A1* | 9/2006 | Monette et al. ............. 700/115 |
| 2007/0063029 A1* | 3/2007 | Brandt et al. ............. 235/376 |

OTHER PUBLICATIONS

United Stated Patent & Trademark Office, Nonfinal Office Action mailed Jan. 30, 2009 for U.S. Appl. No. 11/555,141, filed Oct. 31, 2006, 10 pages.

European Search Report, Application 07843820.7, Aug. 26, 2013, 8 pps.

* cited by examiner

INTELLIGENT ASSEMBLY SYSTEM AND METHOD OF USE

CROSS REFERENCE TO RELATED APPLICATIONS

This application is a continuation-in-part of prior application Ser. No. 11/555,141, filed Oct. 31, 2006 and claims the benefit of U.S. Provisional Application No. 60/882,881 filed Dec. 29, 2006, both of which are incorporated by reference in their entirety.

TECHNICAL FIELD

This disclosure relates to an assembly system and, particularly, to performing assembly operations utilizing assembly information included with one or more components of a product being assembled.

BACKGROUND

In conventional assembly processes, a completed product may be a conglomeration of numerous individual parts, assemblies, and subassemblies. Additionally, the product may be assembled in a factory, and the product may be assembled or processed along an assembly line. Traditionally, assembly lines entail assembling a single component or conducting a single process at a dedicated assembly station along the assembly line. Thus, a line worker repetitively performs that same operation to each product as it advances down the assembly line. Further, the assembly stations are generally arranged according to a logical progression, for example, such that a subsequently added component or subsequently performed process may only be added or performed once all previous steps have been performed. Thus, if the assembly line should ever encounter difficulty at a particular assembly station, all or a portion of the assembly line becomes idle, particularly the assembly stations following the troubled station. As a result, production essentially ceases, which incurs large costs to the manufacturer not only in lost sales but also due to continuing labor costs.

Additionally, present assembly line systems are reliant upon centralized databases to store manufacturing information. For example, the centralized database may include a detailed parts list for each product to be manufactured as well as specifications associated with processes to be performed on the product or components thereof. The central database may need to be accessed at each assembly station along the assembly line to ensure that the appropriate components and processes are performed on the products. Consequently, such assembly line systems are susceptible to delays or stoppages when a problem develops with the central database. As a result, the manufacturer faces significant costs and lost profits.

SUMMARY

A system is described for utilizing assembly product-related information included with one or more components of a product to obtain and assemble and/or apply one or more additional components or processes to a product during assembly. The product-related information may be retained with the product or components thereof throughout both manufacturing as well as the life of the part. For example, the product-related information may be stored on a tag secured to a portion of the part. The tag may be an electronically recordable tag, such as a radio frequency identification ("RFID") tag, an optically recordable tag, a smart card, or any other suitable tag having read/write capability.

Product-related information stored on the tag may be read or otherwise inputted into an assembler of the system at one or more times during manufacturing, for example, to identify a component to be assembled to, or process to be performed upon, the product. According to some implementations, the assembler may identify a build condition of the product, i.e., what manufacturing operations have been performed in the assembly process and what manufacturing operations remain to be performed; identify one or more manufacturing operations to be performed next on the product; and order the required components or processes to be applied to the product. Further, the assembler may obtain and attach the necessary components or apply the necessary processes to the product. Once the one or more manufacturing operations have been performed, the product-related information may be updated to reflect, for example, assembly of one or more components, performance-related information of the one or more components, application of one or more processes, process-related information, and an identifier of an assembler that performed an aspect of the manufacturing operation. The tag may also be updated to include product-related information stored on one or more other tags provided on other components assembled to the product. Product-related information may include an assembly or manufacturing order of the product, component part numbers or identifiers to be assembled at each step of the manufacturing process, required process settings, assembly specifications, tools required for assembly for each manufacturing operation, and the like.

Further, once the assembler reads the product-related information, the manufacturing operations to be completed at the particular assembler may be listed or displayed to an operator of the assembler, along with any corresponding components or processes to be applied. The operator may order or obtain the components or processes to be applied and verify the correct nature of the components or processes once delivered. After assembling the one or more components or applying the one or more processes to the product, the product-related information may be updated to include the type of information discussed above, including, for example, the operator's identification.

According to other implementations, a single assembler may be utilized to perform all of the assembly operations of a product. According to other implementations, the assembler may be fully automated and operable to read the product-related information, order the required components and/or processes, assemble the components, apply the processes, and update the product-related information.

The tag may also be updated with post-production information, such as warranty, repair, service, or maintenance information performed on the product during the life of the product. The product-related information may be used to determine whether a component or process to be applied to the product is the specified component or process or whether the specified component or process is available by comparing an identifier stored on the tag with an identifier stored on the component or with the process. If the identifiers correspond, the component or process is applied. If the identifiers do not correspond, the correct components may be ordered/retrieved from general stores or the correct process may be applied.

Upon completion of the manufacturing process, the product-related information may be transmitted to a centralized data repository, such as a central database. The product-related information may also be transmitted to the central data repository on one or more occasions throughout the manufacturing process. For example, an assembler of the system may transmit the product-related information to the central data repository after completing a manufacturing operation. Thus, the product-related information is transmitted after each step in the manufacturing process. Alternately, the assembler may transmit the product-related information at a predetermined time or only when the manufacturing process is completed.

After manufacturing, the tag containing the product-related information may remain with the product throughout the life of the product and may be read and/or updated to reflect service, maintenance, repair, or other related information. According to some implementations, an assembler reads the product-related information and prompts repair personnel to select a type of repair to be performed. Once the repair personnel selects a repair to be performed, the assembler identifies the necessary components needed for the repair and orders or otherwise obtains the needed components. According to further implementations, the assembler also applies the components to the product. Once the repair is completed the assembler updates the product-information.

The product-related information may also be utilized to collect data, such as to determine whether a manufacturing operation is flawed or incorrectly applied by reading the assembler identifier stored on the tag. Further, the product-related information may contain warranty information or may be utilized to address warranty-related problems associated with the product.

In one general aspect, product-related information included on one or more tags of a product being assembled may be used to perform one or more manufacturing operations. Accordingly, a reading device may be used to read the product-related information from the one or more tags. A processor may be used to determine a manufacturing operation to be performed based on the product-related information, to identify a component or process to be applied during the manufacturing operation, and to verify that an available component or available process is the identified component or process. An assembly station may be used to apply the available component or available process to the product during the manufacturing operation. According to some implementations, the assembly station may include one or more pieces of automated equipment. The writing device may be used to update the product-related information contained on the one or more tags to indicate completion of the manufacturing operation. A data repository may be used to store the product related information, and a network may be used to convey the product-related information to and from the data repository. The processor may send the updated product-related information to the data repository upon completion of one or more manufacturing operations. According to some implementations, the reading device used to read the product-related information from the one or more tags includes a tag reader device, and, according to some implementations, the writing device used to update the product-related information on one or more tags to indicate completion of the manufacturing operation includes a tag writer device. The tags may be RFID devices, a smart card having a processor and memory, an optically recordable medium, or any component operable to have data electronically read therefrom and have data electronically written thereto In another general aspect, one or more manufacturing operations may be performed by utilizing product-related information provided on one or more tags secured to a product being manufactured. The a tag reader may be used to read the product-related information provided on the one or more tags. A processor may be used to identify a component to be assembled to the product or a process to be applied to the product by utilizing the product-related information and to verify an available component is the component designated by the product-related information or an available process is the process designated by the product-related information. A writing device may be used to update the product-related information to indicate an assembly of the available component to the product or the application of the available process to the product, and a writing device may be used to update product-related information to the one or more tags. A memory device may be used to store the product-related information, and a display may be used to display at least a portion of the product-related information. Further, an assembly station may be used to assemble the available component to the product, which, according to some implementations, includes one or more pieces of automated equipment. The assembly station may also be used to apply the available process to the product. A retrieval apparatus, such as a conveyor system or robotic arm, may be used to retrieve the available component. Other retrieval apparatus include, but are not limited to, an automated storage and retrieval system (AS/RS), automated guided vehicles (AGVs), as well as manual and/or automated signals for retrieval. For example, manual and/or automated signals may be used to signal a driver to make a delivery of components. Such signaling methods and equipment may include "bingo boards," electronic pull systems, as well as others. Additionally, a data repository may be used to store the product-related information, and a network may be used to convey the product-related information to and from the data repository.

In another general aspect, manufacturing a product may include defining product-related information. The product-related information may include one or more assembly operations, assembly components, or processes related to a manufacturing process as product-related information. Also, a tag may be secured to one or more of the defined assembly components; at least a portion of the product-related information may be written to one or more of the tags; at least a portion of the product-related information may be read from a first tag; and whether the assembly component with the first tag is located at a designated assembly station may be determined. Also, whether a component identifier read from the first tag as part of the product-related information corresponds to a child component to be assembled may be determined at the designated assembly station. According to some implementations, reading a second component identifier from a second tag secured to the child component and comparing the first and second component identifiers may be utilized to determine whether a component identifier read from the first tag as part of the product-related information corresponds to a child component to be assembled. Additionally, whether a first process identifier read from the first tag as part of the product-related information corresponds to a process to be applied at the designated assembly station may be determined and, according to some implementations, may include receiving a second process identifier and comparing the first and second process identifiers. Also, the child component may be assembled at the designated assembly station when the component identifier corresponds to the child component, and the process may be applied at the designated assembly station when the process identifier corresponds to the process. Further, the production-related information contained on the first tag may be updated to indicate assembly of the child component and the application of the process; information provided on a second tag secured to the child component may be read; the product-related information contained on the first tag may be updated to include the information contained on the second tag; and the updated product-related information may be sent to a central data repository at some point during the manufacturing process of the product.

The details of one or more implementations are set forth in the accompanying drawings and the description below. Other features will be apparent from the description and drawings, and from the claims.

DESCRIPTION OF DRAWINGS

Other aspects of the present invention will be better understood from the following description, along with the accompanying drawings, wherein.

DETAILED DESCRIPTION

Figure 1:
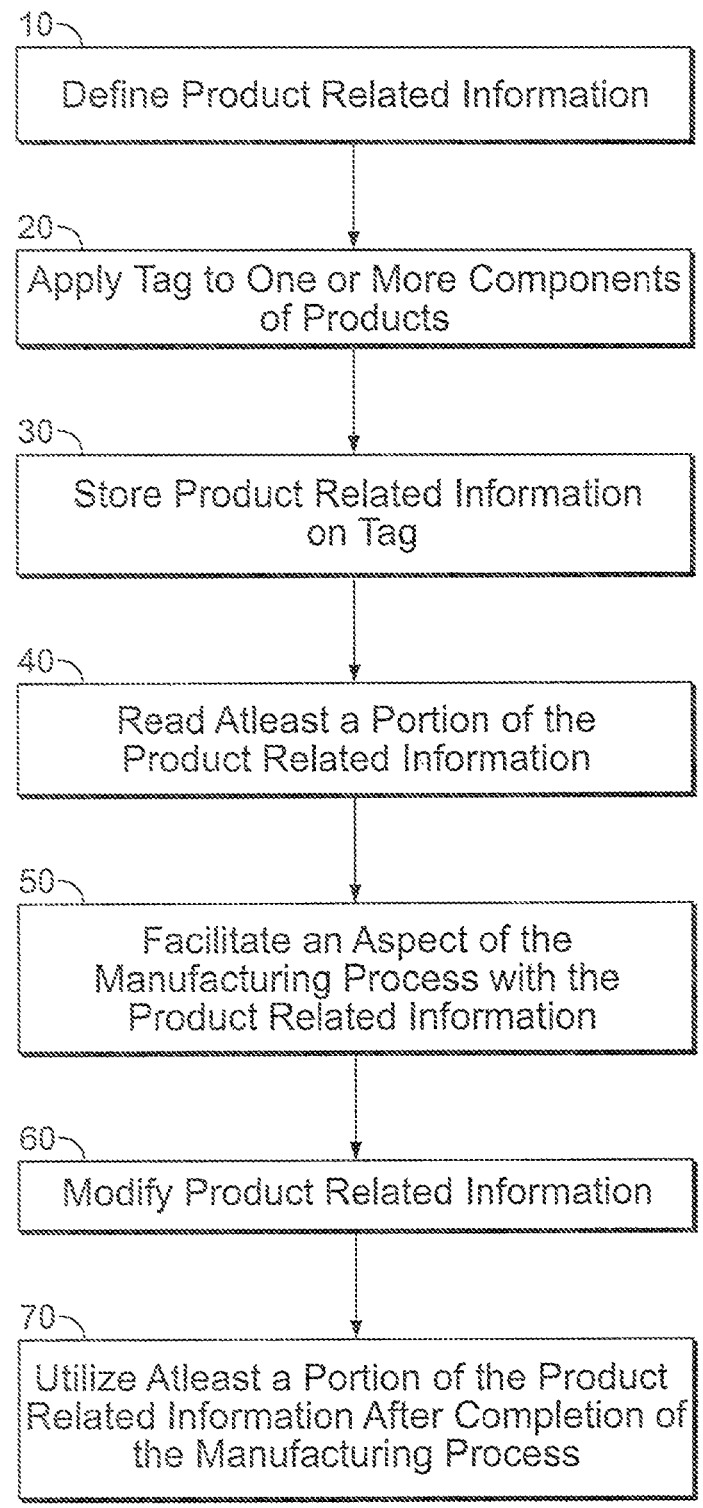
FIG. 1 illustrates a process for including and utilizing product-related information with a product during and after manufacturing of the product.

A manufacturing system and techniques for manufacturing a product are described herein. Product-related information may be stored with the product during both the time of manufacture and may also be stored during the life of the part after manufacturing. According to some implementations, a product may include many parts, assemblies, and subassemblies (referred to collectively hereinafter as "components"). Referring to FIG. 1, product-related information and/or data is defined at 10, and includes information, such as the design of the product, the components and processes to be utilized in the construction of the product, an order or progression defining the order in which components may be assembled and/or processes performed in order to produce the product, performance indicators, and results of quality control tests conducted during the production process. Product-related information may also include any product or component warranty information. Each of the components may be separately manufactured at the product's manufacturing site or manufactured separately at a supplier, for example. At the time of manufacture of each of the components, the manufacturer or supplier may add a tag, such as an RFID tag, an optical memory card, a smart card, or any other device capable of storing information, to the components, as indicated at 20. The tag may be any type of rewritable electronic media. Alternatively, the tag may be integral to the component. Each tag may include a memory device for storing information and optionally a processor for executing instructions contained in the memory device. The tags are also capable of having information written to or read therefrom using methods known in the art. A tag may be attached to some components of the product, while other components of the product may not include a tag. For example, only components considered critical may have an associated tag attached thereto.

Initially, as indicated at 30, component-related information (e.g., a subset of product-related information) may be written to and stored on the tag. For example, if a component is manufactured by a supplier of the product's primary manufacturer ("manufacturer"), the supplier can write the desired information to the component's tag, such as prior to the shipment of the component to the manufacturer. Examples of component-related information may include part lot numbers, identifiers of important or critical subparts of the component, important performance and measurement data, the part number designated by the manufacturer, as well as any other desired information.

Once the components are received at the manufacturer, if shipped from a supplier, or are otherwise ready for assembly, the tags may be read, and the components may be inventoried and positioned appropriately within an assembly line, for example. Further, additional information may be written to the tags. For example, the information written to the tag may include the manufacturing order, the part numbers of other components to be assembled to the component, processes to be performed on the product as it advances through manufacturing, or any other desired information, particularly information related to the manufacturing of the product.

Once the components are received or otherwise ready for assembly, a core component, i.e., a part or combination of parts utilized at the beginning of the assembly process, may be provided at a first station of an assembly line or other desired manufacturing flow ("assembly line" will be used hereinafter to refer to any suitable manufacturing flow for convenience, though the present invention is not so limited, but, rather, is applicable to any suitable or desired manufacturing flow). As the core component advances along the assembly line, additional components are added to the core component and processes may be performed on the core component and any added components. Therefore, the product may be incrementally produced as it advances. Thus, the product in various states of assembly may be referred to as a work-in-progress ("WIP"). Alternatively, the product may be assembled entirely at a single assembly station utilizing an assembler described herein. According to some implementations, an assembly line is not needed.

The assembly line may be arranged in any suitable manner to facilitate production of the product and may include any number of assembly stations, including only a single assembly station. Each assembly station may include an assembler device ("assembler"). According to some implementations, the assembler reads the tag of the core component and verifies whether the core component is the appropriate component and whether the core component is located at the appropriate assembly station in the assembly line. The assembler may also identify and/or assemble various components or apply different processes to the WIP as it advances along the assembly line. For example, according to some implementations, the assembler may be a piece of automated equipment, such as a robot coupled to a computer. The assembler is described in more detail below. At 40 of FIG. 1, the assembler may read the contents of the tag using a suitable tag reader, such as a card reader, an RFID reader, or any other suitable reading device which is able to read the contents of the tag. In some implementations, information read from the tag instructs the assembler or an operator of the assembler on how to complete at least a portion of the assembly process, as indicated at 50. That is, the information read from the tag may indicate with particularity, either alone or in combination with other information, the components to be assembled at the particular assembly station, processes to be performed on the WIP at the assembly station, the manner of assembling the components or performing the processes, and any other desired information required by the assembler or the operator.

Once the tag is read, the assembler may verify the required manufacturing operations needed to complete assembly or a portion of the assembly of the product as well as the necessary additional components and processes to be added. The assembler may also read the information contained on any tags included with the components to be assembled to the WIP at the assembly station. This information may include, for example, the component's part identifier, the component's manufacturing date, batch identifier, manufacturing location, critical performance information, and any other information deemed necessary or desired. Further, where the assembly station is to apply a process to the product, the assembler may also read process-related information. Process-related information is also a subset of product-related information. For example, if the process includes applying a coating to all or a portion of the WIP, information such as coating composition, temperature, humidity, coating thickness, processing time, tool utilized for processing, and the like, may be recorded and subsequently written to the tag. Further, the information read from the tag may also indicate which assembly operations have previously been performed, allowing the assembler or operator to determine whether the WIP is at the appropriate assembly station. This determination may be automatically and/or electronically made once the information from the tag is read by, for example, comparing the assembly steps that have been completed with the assembly step corresponding to the present assembly station. Alternately, the determination may be made manually by the operator of the assembler.

Once the assembler or operator has performed the appropriate operations (e.g., confirmed that the WIP is at the correct assembly station, verified that the necessary components to be assembled are available, assembled the necessary components, and/or performed the necessary processes to the product), the product-related information may be updated and written to the tag, for example, as indicated in FIG. 1 at 60. The information written to the tag may include any of the previously-discussed information as well as any additional information deemed necessary or desirable. For example, information regarding the time and date the assembly step occurred, an identifier of the assembler performing the assembly steps, assembly data, such as bolt torque, press fit loads, tool utilized for production, and any other information may also be written to the tag.

As the WIP proceeds along the assembly line, the number of tags included therewith may grow to a large number. Moreover, one or more tags may be more accessible than others, especially once assembly of the product has been completed. Consequently, as the WIP proceeds through assembly, a single tag may be utilized as a primary tag where all of the product-related information is recorded. The primary tag may be written with all or a portion of all of the information cumulatively contained on the other tags included with the WIP or written thereto during the course of assembly. Further, more than one primary tag may be utilized, for example, when the product is large and assemblers may be provided at locations remote from each other, such as, for example, an automobile assembly line where assemblers may be provided on opposite sides of the vehicle. In one example, an assembler may read the primary tag of the WIP when the WIP is received and write the updated product-related information to a different tag designated as the new primary tag for all or a portion of the remaining manufacturing operations after completion of any assembly steps.

After completion of the manufacturing process, the one or more tags may remain with the product. Consequently, the information contained on the tags may subsequently be accessed and used at any time for any purpose, as indicated at 70. For example, the information contained on the tag may be accessed to troubleshoot an assembly problem, determine a part number for a part included with the product, or identify assembly data relating to a particular manufacturing step, or any other reason.

Figure 2:
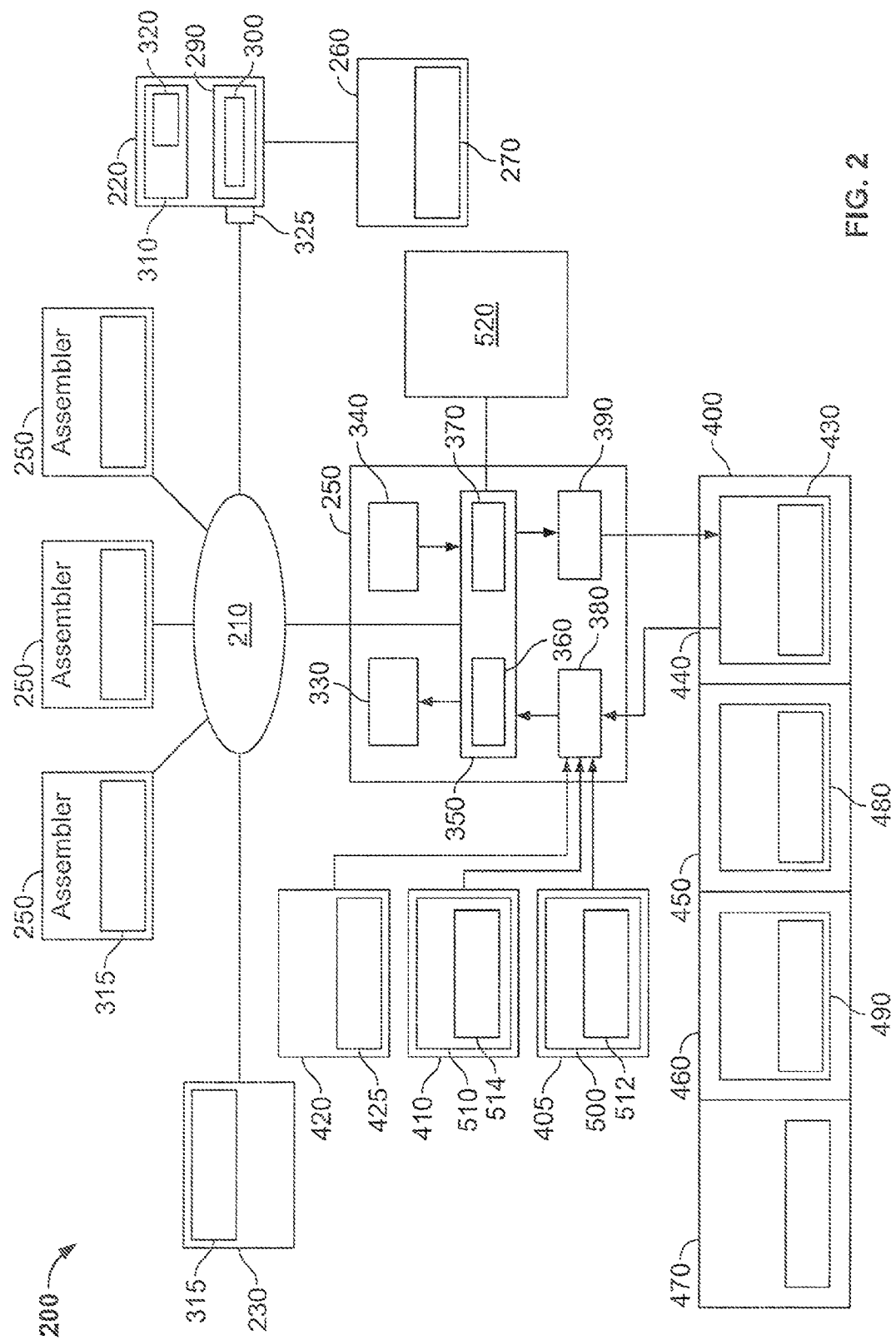
FIG. 2 illustrates a system for utilizing product-related information included with a product during manufacturing of the product.

FIG. 2 is a schematic illustration of a system 200 according to some implementations. System 200 may be a distributed client/server system that spans one or more networks, such as network 210. In such implementations, data may be communicated or stored in an encrypted format using any standard or proprietary encryption algorithm. But system 200 may be in a dedicated environment-across a local area network or subnet—or any other suitable environment. The system 200 may include or be communicably coupled with a server 220, one or more clients 230, and one or more assemblers 250.

Server 220 comprises an electronic computing device operable to receive, transmit, process, and store data associated with system 200. Generally, FIG. 2 provides merely one example of computers that may be used. Each computer is generally intended to encompass any suitable processing device. For example, although FIG. 2 illustrates one server 220 that may be used, system 200 can be implemented using computers other than servers, as well as a server pool. Indeed, server 220 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 220 may be adapted to execute any operating system including Linux, UNIX, Windows Server, or any other suitable operating system. According to one embodiment, server 220 may also include or be communicably coupled with a web server and/or a mail server.

As illustrated (but not required), server 220 is communicably coupled with a relatively remote repository 260 over a portion of network 210. Repository 260 is any intra-enterprise, inter-enterprise, regional, nationwide, or substantially national electronic storage facility, data processing center, or archive that allows for one or multiple registration processors to dynamically store data 270, which may include any data related to, used, created, stored by, or otherwise associated with an application. Repository 260 may be a central database communicably coupled with one or more servers 220, clients 230, and assemblers 250 via a virtual private network (VPN), SSH (Secure Shell) tunnel, or other secure network connection. For example, the data 270 may be assembly data identifying each product assembled or in the process of being assembled, the assembly status of the products currently being assembled, the components and component identifiers included with each component, processes and process data associated with each product, the time each assembly operation occurred, as well as any other desired information. Repository 260 may be physically or logically located at any appropriate location so long as the repository 260 remains operable to store information and/or data associated with system 200 and communicate such information and/or data to server 220 or at least a subset of the plurality of clients 230 and/or assemblers 250. According to some implementations, because the product-related information is stored with one or more components of the product, such as one or more tags affixed to components of the product, an assembler 250 and server 220 may communicate infrequently. For example, the assemblers 250 and the server 220 may only communicate to initially transmit the product-related information to one or more tags affixed to one or more components of the product, such a primary tag, prior to performance of any manufacturing operations. Once the product-related information is stored on the one or more tags, the assemblers 250 and the server 220 may not communicate again with each other during the course of the manufacturing operations. Also, according to some implementations, the assemblers 250 and the server 220 may communicate to initially configure the assemblers 250. That is, the server 220 may transmit data to the assemblers 250 indicating the manufacturing operations to be performed at the assembler 250 and the manner in which those manufacturing operations are to be performed. According to some implementations, the assemblers 250 may communicate with server 220 to transmit the product-related information after assembly completion of the products. The received product-related information may be stored in the repository 260, for example. Consequently, the server 220 may receive the manufacturing history for each product after the products have been completely assembled. Thus, according to some implementations, once the product-related information has been transmitted to and stored on the one or more tags, such as the primary tag, the assemblers 250 and the server 220 may not communication during, or even after, the manufacturing process since the product-related information provided on the one or more tags includes all necessary information to complete manufacturing of the product.

As a possible supplement to or replacement of repository 260, illustrated server 220 may include local memory 290. Memory 290 may include any memory or database module and may take the form of volatile or non-volatile memory including, without limitation, magnetic media, optical media, random access memory (RAM), read-only memory (ROM), removable media, or any other suitable local or remote memory component. Illustrated memory 290 may include application data 300 for one or more applications, as well as data involving VPN applications or services, firewall policies, a security or access log, print or other reporting files, HTML files or templates, related or unrelated software applications or sub-systems, and others. Consequently, memory 290 may also be considered a repository of data, such as a local data repository for one or more applications.

Application data 300 may include data associated with one or more applications or modules. In some implementations, the application data 300 (or pointers thereto) may be stored in one or more tables in a relational database described in terms of SQL statements or scripts. In other implementations, the application data 300 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. In short, the application data 300 may comprise one table or file or a plurality of tables or files stored on one computer or across a plurality of computers in any appropriate format. Indeed, some or all of the application data 300 may be local or remote and may store any type of appropriate data. Moreover, the application data 300 may be bundled and/or transmitted in a different format than the format in which application data 300 was stored. In short, the application data 300 may be provided or otherwise stored in one or more repositories, such as the repository 260 or the memory 290. These repositories may be centrally located and may be associated with one or more business modules that may be unrelated.

Server 220 may also include processor 310. Processor 310 executes instructions and manipulates data to perform the operations of the server 220 and may be, for example, a central processing unit (CPU), a blade, an application specific integrated circuit (ASIC), or a field-programmable gate array (FPGA). Although FIG. 2 illustrates a single processor 310 in server 220, multiple processors 310 may be used according to particular needs and reference to processor 310 is meant to include multiple processors 310 where applicable. Processors suitable for the execution of a computer program include, by way of example, both general and special purpose microprocessors, and any one or more processors of any kind of digital computer. Generally, the processor will receive instructions and data from ROM or RAM or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In the illustrated embodiment, processor 310 executes application 320.

At a high level, application 320 is any application, program, module, process, or other software that may utilize, change, delete, generate, or is otherwise associated with the data and/or information 270 and/or 300 associated with one or more manufacturing operations occurring at the assemblers 250. In certain cases, system 200 may implement a composite application 320, as described below. Regardless of the particular implementation, "software" may include software, firmware, wired or programmed hardware, or any combination thereof as appropriate. Indeed, application 320 may be written or described in any appropriate computer language including C, C++, Java, Visual Basic, assembler, Perl, any suitable version of 4GL, as well as others. It will be understood that, while application 320 may include numerous sub-modules, application 320 may instead be a single multi-tasked module that implements the various features and functionality through various objects, methods, or other processes. Further, while illustrated as internal to server 220, one or more processes associated with application 320 may be stored, referenced, or executed remotely. For example, a portion of application 320 may be a web service that is remotely called, while another portion of application 320 may be an interface object bundled for processing at remote client 230 and/or assembler 250. Moreover, application 320 may be a child or sub-module of another software module or application (not illustrated). Indeed, application 320 may be a hosted solution that allows multiple parties in different portions of the process to perform the respective processing.

The processor 310 executes instructions contained in the application 320 to control various aspects of the manufacturing operations. For example, the application 320 may control when the product-related information is sent to or from the repository 260, monitor an operating condition of the assemblers 250, track an assembly condition of products being manufactured, as well as perform other functions.

More specifically, application 320 may be a composite application, or an application built on other applications, that includes an object access layer (OAL) and a service layer. In this example, application 320 may execute or provide a number of application services. Such an object access layer may be operable to exchange data with a plurality of systems and to present the data to a composite application through a uniform interface. The example service layer is operable to provide services to the composite application. These layers may help the composite application to orchestrate a process in synchronization with other existing processes (e.g., native processes of systems) and leverage existing components in the IT platform. Further, composite application 320 may run on a heterogeneous IT platform. In doing so, composite application 320 may be cross-functional in that it may drive processes across different applications, technologies, and organizations. Accordingly, composite application 320 may drive end-to-end processes across heterogeneous systems or sub-systems. Application 320 may also include or be coupled with a persistence layer and one or more application system connectors. Such application system connectors enable data exchange and integration with sub-systems and may include an Internet Communication Manager/Internet Communication Framework (ICM/ICF) interface, an Encapsulated Post-Script (EPS) interface, and/or other interfaces that provide Remote Function Call (RFC) capability. It will be understood that while this example describes a composite application 320, it may instead be a standalone or (relatively) simple software program. Regardless, application 320 may also perform processing automatically, which may indicate that the appropriate processing is substantially performed by at least one component of system 200. It should be understood that automatically further contemplates any suitable administrator or other user interaction with application 320 or other components of system 200.

Referring again to FIG. 2, server 220 may also include interface 325 for communicating with other computer systems, such as clients 230 and assemblers 250, over network 210 in a client-server or other distributed environment. In certain implementations, server 220 receives data from internal or external senders through interface 325 for storage in memory 290 and/or processing by processor 310. Generally, interface 325 comprises logic encoded in software and/or hardware in a suitable combination and operable to communicate with network 210. More specifically, interface 325 may comprise software supporting one or more communications protocols associated with communications network 210 or hardware operable to communicate physical signals.

Network 210 facilitates wireless or wireline communication between computer server 220 and any other local or remote computer, such as the one or more clients 230 and the one or more assemblers 250. Network 210 may be all or a portion of a secured network. In another example, network 210 may be a VPN merely among a server 220, one or more clients 230, and one or more assemblers 250 across wireline or wireless link. Such an example wireless link may be via 802.11a, 802.11b, 802.11g, 802.20, WiMax, and many others. While illustrated as a single or continuous network, network 210 may be logically divided into various sub-nets or virtual networks without departing from the scope of this disclosure, so long as at least a portion of network 210 may facilitate communications among server 220, at least one client 230, and at least one assembler 250. For example, server 220 may be communicably coupled to the repository 260 through one sub-net while communicably coupled to clients 230 and assemblers 250 through another. In other words, network 210 encompasses any internal or external network, networks, sub-network, or combination thereof operable to facilitate communications between various computing components in system 200. Network 210 may communicate, for example, Internet Protocol (IP) packets, Frame Relay frames, Asynchronous Transfer Mode (ATM) cells, voice, video, data, and other suitable information between network addresses. Network 210 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 210 may be a secure network accessible to users via certain local or remote clients 230 or assemblers 250.

Clients 230 and assemblers 250 may be or include any computing device operable to connect or communicate with server 220 or network 210 using any communication link. At a high level, one or more of clients 230 and/or assemblers 250 may include or execute at least an application interface, such as a graphical user interface ("GUI") 315, although the interface need not be graphical in nature. Additionally, the one or more of clients 230 and/or assemblers 250 may comprise an electronic computing device operable to receive, transmit, process, and store any appropriate data associated with system 200. It will be understood that there may be any number of clients 230 and/or assemblers 250 communicably coupled to server 220. It will also be understood that once the assemblers 250 are programmed, e.g., programmed to perform the required manufacturing operations, the assemblers 250 may operate independently from server 220 or the network 210, particularly should the server 220 or network 210 become unavailable. Moreover, for ease of illustration, each client 230 or assembler 250 may be described in terms of being used by one user. But many users may use one client 230 or assembler 250 or that one user may use multiple clients 230 or assemblers 250. As used in this disclosure, clients 230 and assemblers 250 may include a personal computer, touch screen terminal, workstation, network computer, kiosk, wireless data port, smart phone, personal data assistant (PDA), one or more processors within these or other devices, or any other suitable processing device. For example, clients 230 and/or assemblers 250 may be or include a PDA operable to wirelessly connect with an external or unsecured network. In another example, clients 230 and/or assemblers 250 may be or include a laptop computer that includes an input device, such as a keyboard, keypad, touch screen, a pointing device, such as a mouse or trackball, or other device that can accept information, and an output device that conveys information associated with the operation of server 220, clients 230, or assemblers 250, including digital data, visual information, or GUI 315. Both the input device and output device may include fixed or removable storage media such as a magnetic computer disk, CD-ROM, or other suitable media to both receive input from and provide output to users of clients 230 or assemblers 250 through the display, namely the client portion of GUIs or application interface 315.

According to some implementations, the assemblers 250 may include a display 330, which may be a cathode ray tube (CRT), a liquid crystal display (LCD), a plasma display, a series of lights, or any other structure for relaying information, such as an operating condition of the assembler 250. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. The assembler 250 may also include an input device 340, such as one or more of the input devices described above, for inputting instructions, such as a program. Alternately, for example, the input device 340 may be utilized to input information that may be written to a tag, such as critical manufacturing information (e.g., product performance data, bolt torque data, coating thickness data, tolerance data, and other measurement data), part numbers, lot numbers, the time and date the assembly operation occurred, the identification number of the assembler 250 or other equipment utilized to accomplish an assembly operation, process data, equipment utilized to apply a process, or any other desired information to be retained with the product or desired to be retained.

Further, as described above, the assembler 250 may include a computer 350 having a processor 360, such as a processor of the types described above, and a memory device 370, such as a memory device of the types described above. The processor 360 executes instructions and manipulates data to perform operations of the assembler 250. The assembler 250 may also include a device reader 380 and a device writer 390. The device reader 380 is operable to read the product-related information from WIP 400 as well as component- and process-related information from components 405, 410 and processes 420 to be applied to the WIP 400 during manufacturing. The device writer 390 is operable to write product-related information to one or more tags of the WIP 400, such as the primary tag 430. According to some implementations, the computer 350 may update the product-related information to reflect the completion of one or more manufacturing operations, and the device writer 390 may write the updated product-related information to the primary tag 430, such as by replacing the product-related information on the tag with the updated product-related information. According to other implementations, the product-related information contained on the primary tag 430 is updated by amending the product-related information to reflect the completion of the manufacturing operations. The device writer 390 may be utilized to update the product-related information contained on the primary tag 430 when the assembler 250 or operator (not shown) of the assembler 250 has completed one or more manufacturing operations, such as attaching one or more components or applying one or more processes to the WIP 400.

As illustrated, the WIP 400 includes a core component 440, a first component 450, a second component 460, and a process 470 that has been performed on the WIP 400. The core component 440 also includes a tag, which acts as the primary tag 430. The first and second components 450, 460 also include tags 480, 490, respectively, although not all of the components assembled to form the WIP necessarily include a tag. Further, although the tag of the core component 440 is indicated as being the primary tag 430, either of the tags 480, 490 may be the primary tag. Also, although the WIP 400 is indicated as having only three components 440, 450, and 460 and the process 470, the WIP 400 may have any number of components included therewith and have been subjected to any number of processes.

As WIP 400 encounters the assembler 250, the device reader 380 reads the product-related information from the primary tag 430. The product-related information is transmitted to the computer 350. According to some implementations, only the primary tag 430 is read into the computer 350 because, for example, the information contained on the tags 480 and 490 may have already been consolidated and stored on the primary tag 430, for example, at a previous location along the assembly line. That is, all information or all necessary information stored on tags 480, 490 may have already been written to the primary tag 430, rendering it unnecessary to scan the tags 480, 490. Once the product-related information has been read into the computer 350, a production status of the WIP 400, such as, for example only, the total assembly operations of the manufacturing process, the assembly operations previously completed, the assembly operations that are not yet completed, and the assembly operation to be completed next, may be displayed on the display 330, for example. The product-related information may also include instructions for the assembler 250 or the operator on how to complete at least a portion of the assembly process. That is, the information read from the primary tag 430 may indicate, with particularity, the components to be assembled at the particular assembly station, processes to be performed on the WIP 400 at the assembly station, the manner of assembling the components or performing the processes, and any other desired information to instruct the assembler 250 or operator of the assembler 250 to conduct the assembly process. Alternately, once the product-related information is read into the computer 350, only information regarding the next assembly operation to be performed on the WIP 400 may be displayed. Further, the assembler 250 may automatically determine whether the WIP 400 is located at the appropriate assembly station. For example, the assembler 250 may compare the assembly operations to be completed next with the assembly operations to be performed by or at the present assembler 250. Thus, the assembler 250 may quickly determine whether the WIP 400 is at the appropriate assembly location. In some implementations, once the product-related information is read into the computer 350, all or a portion of the product-related information is displayed on the display 330 and the operator of the assembler 250 determines whether the WIP 400 is located at the appropriate assembly station.

Once the assembler 250 has read the product-related information from the WIP 400, the assembler 250 may send a request for the components 405 and 410 to be assembled and the process 420 to be applied. Alternately, the operator of the assembler 250 may request delivery of the components 405 and 410, and the process 420. According to other implementations, the components 405 and 410 and process 420 are already present or otherwise available for application to the WIP 400. As shown, components 405 and 410 also include tags 500 and 510, respectively, although the components to be assembled to the WIP 400 at an assembly station need not necessarily have a tag associated therewith. The tags 500, 510 may also be read by the device reader 380 and the component-related information 512, 514 stored thereon may be transmitted to the computer 350 and stored, such as on the memory device 370.

The process 420 may include process-related information 425. The process-related information 425 may be manually entered into the computer 350 via the input device 340. Alternately, the process information 425 may be inputted via a wired or wireless input or the process information 425 may be automatically transmitted to the computer 350 without any required input from an operator. The process information 425 may be stored in the memory device 370.

The components 405 and 410 may then be verified as being the correct components to be assembled to the WIP 80 at the particular assembly station. The process 420 may similarly be verified. Verification may be performed in any manner, such as by using the techniques discussed above. According to some implementations, the assembler 250 automatically verifies that the components 405 and 410 are the appropriate components and that process 420 is the appropriate process by comparing all or a portion of the component- and/or process-related information to the components and/or processes to be assembled at the present assembler 250 or to the product-related information read from the primary tag 430. According to other implementations, component-related information read from the tags 500 and 510 may be displayed on the display 330, and the operator verifies that the components 405 and 410 are the correct components. Similarly, the operator may confirm that the process 420 is the appropriate process and that the process 420 is available. Once verified, components 405 and 410 are assembled and the process 420 is applied to the WIP 400.

According to some implementations, the operator of the assembler 250 may perform the assembly operations. According to another implementations, the assembler may be coupled to or fully integrated with one or more pieces of automated equipment 520, such as a robot (e.g., a robotic arm or any other piece of equipment required to perform an assembly operation in an automated manner) to assemble one or more components, such as components 405 and 410, to the WIP 400, or to apply one or more processes, such as process 420, to the WIP 400 without the need for any human intervention. Once the components 405 and 410 are assembled and the process 420 is applied, the product-related information contained on the primary tag 430 may be updated to include, for example, an indication the assembly operations were completed, all or part of the information read from the tags 500 and 510, all or part of the process-related information 425, critical manufacturing parameters (e.g., bolt torque, coating thickness, component hardness, important dimensions, or any other desired information), an identifier of the assembler 250, the operator's identification number (if applicable), and other needed or desired information. Additionally, the primary tag may be reassigned to one or more of the tags of the newly added components or to the tag of one or more of the tags of the previously added components. The product-related information may be updated by utilizing the device writer 390.

Figure 3:
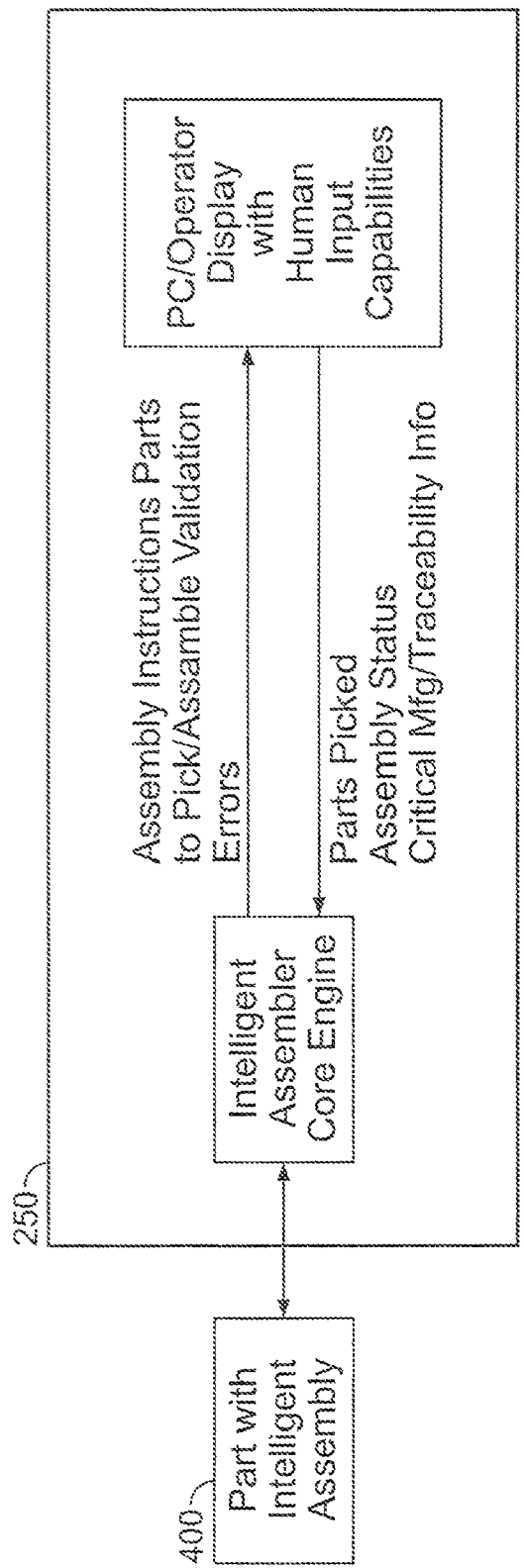
FIG. 3 illustrates an assembler having an operator for performing assembly operations and process applications to the product.

At least some of the operations disclosed as being performed by the assemblers 250 are actually performed by the processors 360 of the assemblers 250. FIG. 3 illustrates some implementations of the assembler 250 in which a human operator performs one or more of the tasks of scanning the primary tag 430 of the WIP 400 utilizing the device reader 380; reviewing the product-related information contained on the primary tag 430, for example, when the product-related information is displayed on the display 330; confirming that the WIP 400 is at the appropriate assembly station; retrieving the components to be assembled; and preparing the process to be applied. The operator may further verify that the one or more components retrieved and the one or more processes prepared are the appropriate components and processes. For example, the operator may input the component-related information by scanning tags attached to the respective components, which may be listed on the display 330, and compare the component-related information with the product-related information scanned from the primary tag, which also may be listed on display 330. Similarly, the operator may verify the one or more processes to be applied at the assembly station by comparing the product-related information displayed on the display 330 with the process-related information associated with the processes, which may also be displayed on display 330. The process-related information may be manually inputted via the input device 340 or may be automatically inputted into the computer 350 of the assembler 250 via a network connection.

Figure 4:
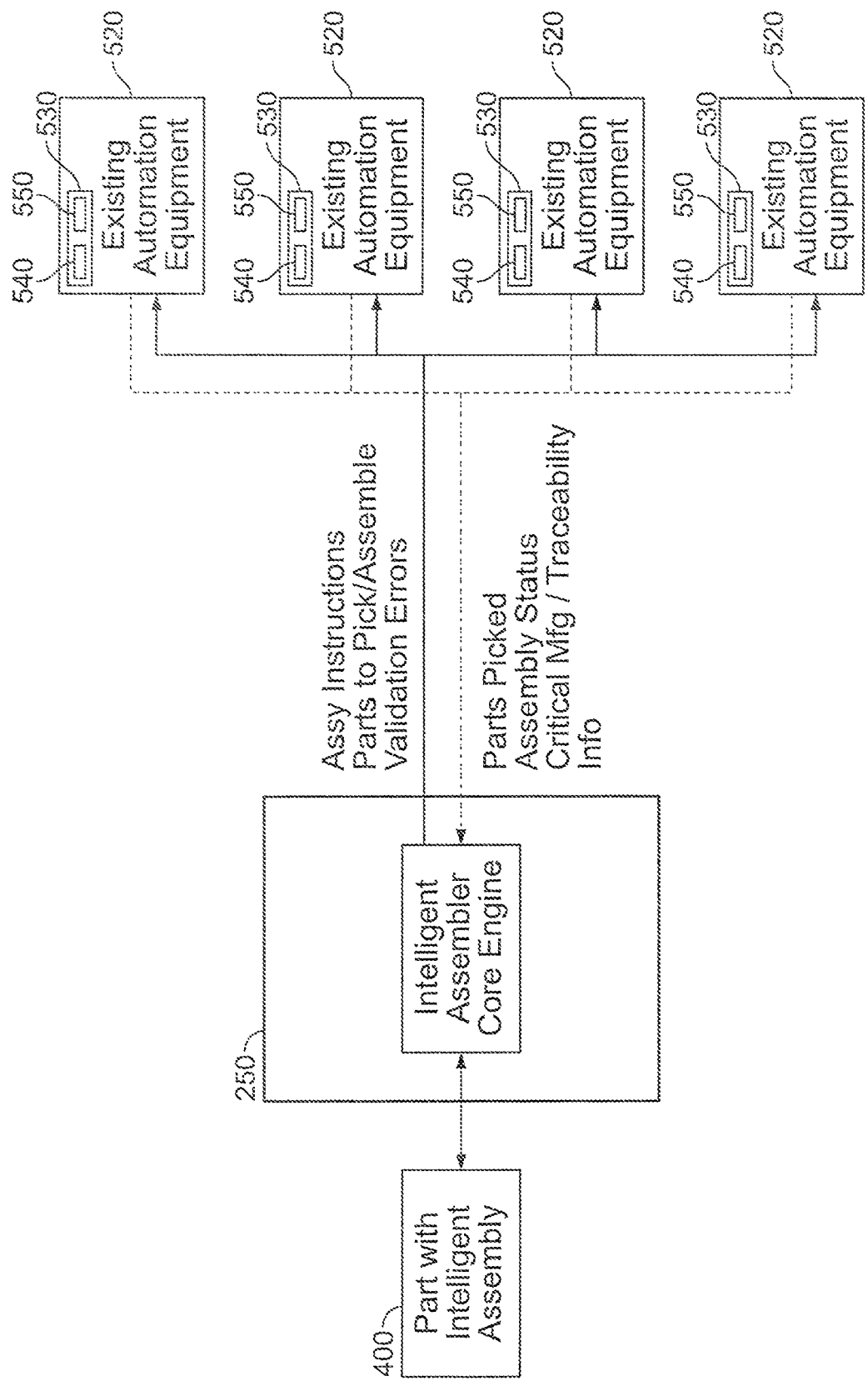
FIG. 4 illustrates an implementation of an assembler coupled to automated equipment for performing at least one of an assembly operation and process application without the need of an operator.
Figure 5:
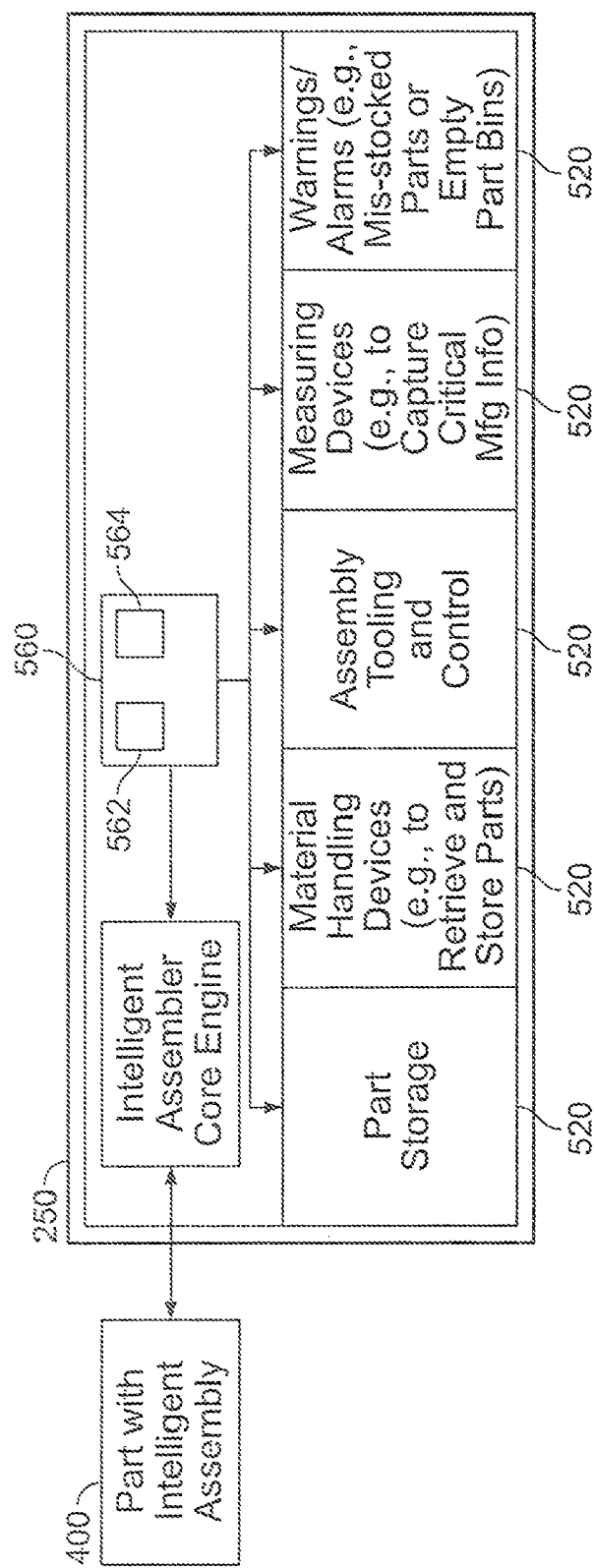
FIG. 5 illustrates an implementation of a fully integrated assembler for performing at least one of an assembly operation and process application without the need of an operator.

FIGS. 4 and 5 illustrate implementations of the assembler 250 wherein the assembler 250 is fully automated. In FIG. 4, the assembler 250 is connected to one or more pieces of automated equipment 520. Each piece of automated equipment 520 may include a computer 530 having a processor 540 and a memory device 550. The processor 540 and the memory device 550 may be of the types described above. Alternately, as shown in FIG. 5, the assembler 250 is fully integrated with the automated equipment 520 and the automated equipment 520 and the assembler 250 may share or operate from a common computer 560, having a processor 562 and a memory device 564.

The WIP 400 may be delivered to the assembler 250 in a manual or automated way, such as by a conveyor system (not shown), a robotic arm (not shown), or any other manual or automated equipment. Once the WIP 400 arrives at the assembler 250, the product-related information is scanned and read into the assembler 250. Thereafter, the assembler 250 may automatically determine what components and/or processes are required to be performed to complete the next step of manufacturing based on the scanned product-related information. Thus, the assembler 250 may be adaptable to an assembly process based on the product-related information read from the WIP rather than being single-purposed. Consequently, according to some embodiments, a particular assembler is able to read product-related information from one WIP and perform the next assembly operation dictated by the product-related information and, subsequently, read the product-related information from a second WIP and perform a different assembly operation that is required to continue the assembly of the second WIP.

Again referring to FIGS. 4 and 5, the assembler 250 may automatically order the required components and/or processes indicated by the scanned product-related information. Once delivered, the assembler may scan or otherwise read the component-related information and the process-related information associated with the delivered components and processes, such as in a manner described above, and verify that the delivered components and processes are appropriate. The automated equipment 520 may then apply the components and/or processes to the WIP 400, such as by identifying and selecting the appropriate tool or tools to apply components and processes. Tooling information may also be included with the product-related information scanned into the assembler 250.

Once the assembly operation to be performed at the assembler 250 is completed, the WIP 400 is advanced to the next assembly station, where applicable. Because assembly information may be provided on the tags, the manufacturing process may be carried out without requiring a central data repository for storing product-related information. Thus, the information needed to assemble the product may be stored on one or more tags, such as the tag of the core component. Consequently, the assembly techniques are not susceptible to problems that may develop with a centralized data repository—problems that would otherwise delay or idle operations of an assembly line. However, a central data repository may be utilized, such as the central repository 260 or the memory 290 of the system 200.

Thus, once any designated processes have been applied or any designated components have been assembled at an assembly station, the centralized data repository may be updated to indicate the assembly condition of the particular WIP. Further, the central data repository may be updated with all of the information contained in the primary tag of the WIP to provide a complete record of the WIP. However, if a problem should occur to the centralized data repository, updating the centralized data repository may be postponed until the problem has been corrected or until the assembly of the product has been completed. Alternately, the centralized data repository may be updated only after manufacturing of the product has been completed. As a result, because the described assembly techniques are not dependent upon a centralized data repository, costs associated with a centralized data repository may be reduced or eliminated altogether. For example, with reliance upon a centralized data repository, a large cost must be expended to implement fault tolerance capabilities, redundancy, and ongoing maintenance costs to maintain uptime of the centralized data repository. Thus, the ability to operate independently of a centralized data repository enables avoiding or significantly reducing the costs associated with operating the centralized data repository.

The described techniques enable an assembler or operator to perform several tasks. For example, an assembler or operator may be responsible for assembling various components and/or performing several processes. Because the tags included with the WIP may include the entire assembly procedures and instructions, the information included on the tags may provide all of the information needed by the assembler or operator to accomplish these tasks. Accordingly, an assembler or operator may be trained or programmed to perform multiple functions, which may result in a reduction in the total number of assemblers and operators required to manufacture the product. Additionally, an assembly operation may reduce costs by having an assembler perform several assembly steps as opposed to a single assembler performing only a single step, such as assembling only a single component or performing only a single process. Further, because the assembly information is located in the tag provided on the WIP, one or more assembly operations may be quickly relocated to another assembly station should one or more assembly stations become inoperable or otherwise unavailable. As a result, the assembly line may be made further flexible and resilient, reducing or eliminating costs associated with production delays. The new assembler or operator at a substitute assembly station need only look to the information provided on the tag to identify the last assembly operation performed and, consequently, understand the next required assembly operation. Moreover, the assembly instructions for the assembly operations may also be stored on the tag, indicating how to perform the assembly operations.

Assembly lines utilizing the described techniques may be more reliable. Particularly, implementations utilizing tags that electronically store the product-related information may reduce human error because an assembler does not rely on reading information provided on paper sheets, which may become soiled, damaged, or otherwise lost. Also, the described techniques reduce the risk of misreading assembly instructions or specifications where the assembler includes automated equipment, such as a robot having a computer and a tag reader to read the assembly information provided on a tag. Therefore, the risk of misreading assembly/manufacturing information is significantly reduced.

Once the products are completely assembled, the one or more tags, e.g., the one or more primary tags, remain with the product for the life of the product. Thus, if the product ever requires maintenance or experiences difficulty, e.g., if the product ever experiences a defect, the information provided in the tags, such as the one or more primary tags, may be utilized to identify the cause of the defect. For example, if an automobile experiences the separation of a wheel during operation, the customer or the manufacturer may read the contents of the primary tag and determine whether torque loads used to secure the wheel to the car during manufacturing were within the design specifications. Further, data contained on the product's primary tag (or any other tag included with the product) may be quickly collected by the manufacturer, for example during warranty investigations. Consequently, the manufacturer may quickly identify a particular problem that may exist with a component or an assembly or manufacturing step of the product. Because the information is maintained in a central location that accompanies the product throughout the life of the product, information regarding the product, information that may otherwise difficult or not otherwise obtainable, is able to be efficiently and reliably collected. For example, such information may only be retained at the manufacturing facility, if at all. Thus, in order to locate manufacturing information in such circumstances, a request must be forwarded to the manufacturer and a search conducted thereafter, requiring resources of the manufacturer to be diverted.

Therefore, the described techniques may also save costs associated with collecting manufacturing information and increase the likelihood that useful market information, e.g., statistical product defect data, and the like, is not otherwise lost.

Further, post-production information, such as repair information, general maintenance information, or any other information, may also be stored on the primary tag or any tag included with the product. Thus, in some implementations, the tag is able to store a product's service and maintenance history, which may be read, accessed, or written to by a service provider, for example, whenever the product is subjected to maintenance or service. Other information may also be added to the tag. For example, repair or maintenance instructions may be stored on the tag so that a repairman or technician may quickly access needed information to effect a repair or conduct maintenance on the product. As a result, a repairman or technician is relieved of having to search through a service manual or service system in order to service or repair the product.

Figure 6:
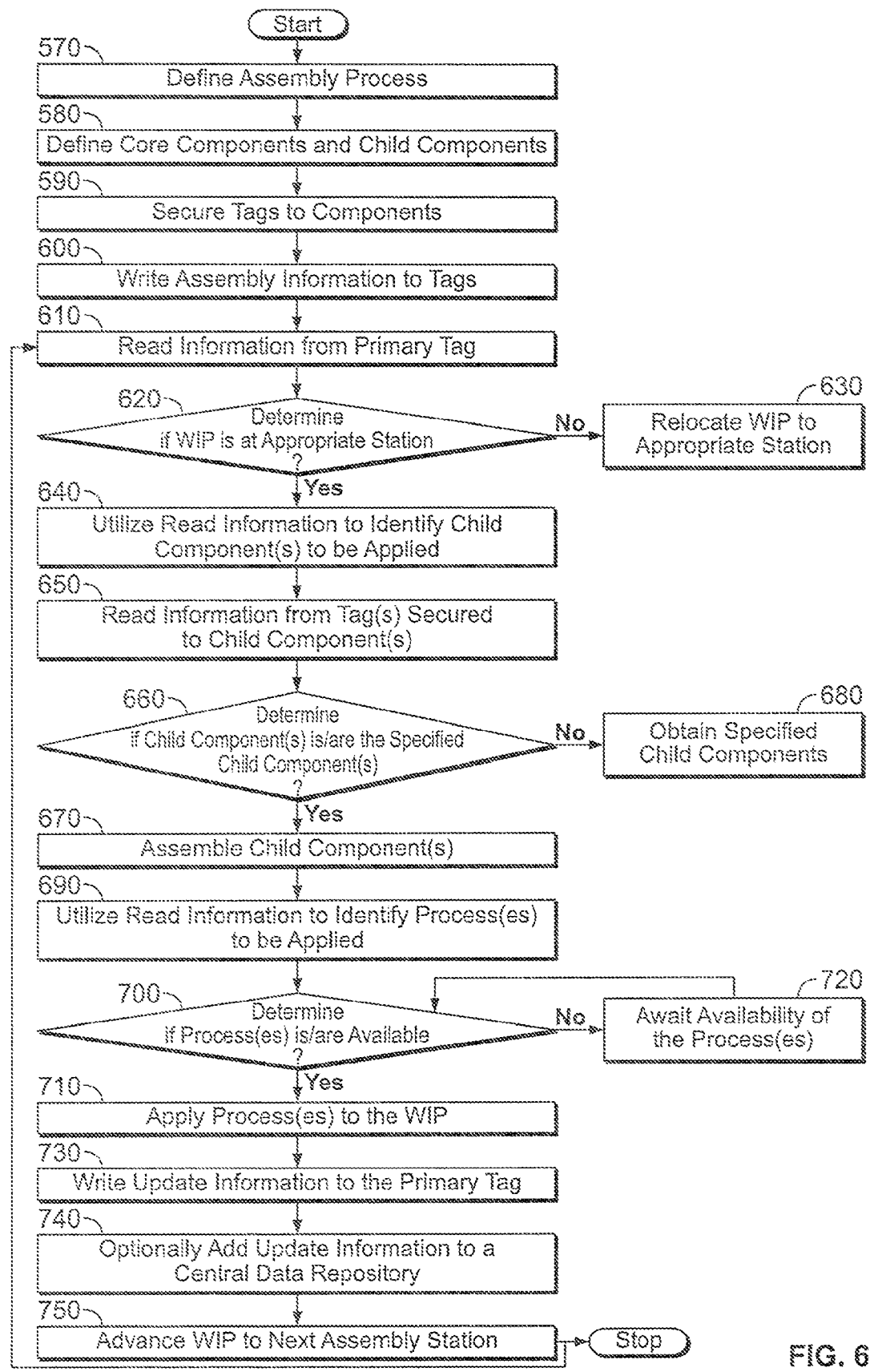
FIG. 6 illustrates a manufacturing process utilizing product-related information provided with the product and an assembler that utilizes the product-related information according to some implementations.

FIG. 6 shows an assembly method according to an implementation of the present disclosure. At 570, the overall assembly order or process is defined. The assembly order may include, for example, the different operations required to complete the product from starting with the core component up through the completed product. The assembly order may also define the number of operations, the components to be assembled at each operation, the process to be applied and corresponding position in the assembly order, and any other information relating to the assembly of the product. At 580, the core component and other components, interchangeably referred to as child components, are also designated, and, at 590, the associated tags are applied to the core component and any other child components, as required or desired. The product-related information may be written to the tags at 600.

At 610, the product-related information is read from the one or more tags, such as the primary tag of the core component or WIP, and, according to some implementations, the product-related information is utilized to determine whether the WIP is located at the appropriate assembly station at 620. If the WIP is not located at the appropriate assembly station, the WIP is relocated to the appropriate assembly station, as indicated at 630. According to other implementations, however, the WIP need not be delivered to any particular assembly station because the assembler located at any given assembly station is flexible and may be able to perform any assembly operation required to produce the product. At 640, the product-related information is utilized to identify any child components and processes to be applied to the WIP. In some implementations, the child components and processes identified for assembly or application to the WIP at the assembly station are ordered, while, in other implementations, the child components and processes may already be available at the assembly station for application to the WIP. Once delivered or otherwise made available, the tags associated with one or more child components to be assembled at the assembly station are read at 650. A determination is made at 660 as to whether the child components provided at the assembly station are the specified child components designated for assembly at the assembly station. If the components parts are the specified child components for assembly, the child components are assembled to the WIP at 670. However, if the child components are not the specified child components, the appropriate child components are obtained at 680.

The particular assembly station may also require application of a process, which may be identified by the product-related information read from the primary tag. At 690, the product-related information is utilized to determine a process to be applied. Accordingly, at 700, it is determined whether the process is available or whether the process characteristics are within specified ranges. For example, if a process involves forming a coating on a portion of the WIP, characteristics of the process to ensure a proper coating may be controlled, such as temperature, coating material composition, composition viscosity, color, and the like. If the process is available and/or within specified values, the process is applied to the WIP at 710. If the process is not available, the WIP awaits availability of the process at 720. Alternately, the WIP may be transferred to another location along the assembly line to conduct the specified process.

Once all of the assembly operations to be conducted at the assembly station have been completed, the information contained on the primary tag is updated at 730, such as with the information contained on the child component tags and with desired information relating to the applied process. At 740, product-related information may be transmitted to a central data repository indicating, for example, completion of a manufacturing operation. At 750, the WIP is advanced to the next assembly station in the assembly order, where applicable.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

A number of implementations have been described. Nevertheless, it will be understood that various modifications may be made. Accordingly, other implementations are within the scope of the following claims.

What is claimed is:

1. A system for utilizing product-related information included on one or more tags of a product being assembled to perform one or more manufacturing operations, the system comprising:
    a tag reader adapted to read the product-related information from the one or more tags;
    a first primary tag;
    a second primary tag that is physically separate from the first primary tag;
    a first processor adapted to:
        determine a first manufacturing operation to be performed based on the product-related information;
        identify at least one of a first component or process to be applied during the first manufacturing operation; and
        verify that at least one of a first available component or available process is the identified first component or process;
    a second processor adapted to:
        determine a second manufacturing operation to be performed based on the product-related information;
        identify at least one of a second component or process to be applied during the second manufacturing operation; and
        verify that at least one of a second available component or available process is the identified second component or process;
    a first assembly station adapted to apply the at least one of the first available component or available process to the product during the first manufacturing operation;
    a second assembly station adapted to apply the at least one of the second available component or available process to the product during the second manufacturing operation;
    one or more tag writers collectively adapted to update the product-related information on the first primary tag of the product to indicate completion of the first manufacturing operation, to consolidate the product-related information on one or more of the tags onto the first primary tag, to update the product-related information on the second primary tag of the product to indicate completion of the second manufacturing operation, and to consolidate the product-related information on the first primary tag and at least one other tag onto the second primary tag.

2. The system according to claim 1 further comprising:
    a data repository; and
    a network adapted to convey the product-related information to the data repository.

3. The system according to claim 2, wherein each processor is further adapted to send the updated product-related information to the data repository upon completion of the respective manufacturing operation.

4. The system according to claim 1, wherein the one or more tags are selected from the group consisting of a radio frequency identification device, a smart card having a processor and memory, an optically recordable medium, or a component operable to have data electronically read therefrom and have data electronically written thereto.

5. The system according to claim 1, wherein one or more of the first or second assembly stations includes at least one piece of automated equipment.

6. A system for performing one or more manufacturing operations utilizing product-related information provided on a plurality of tags secured to a product being manufactured, the system comprising:
   means for reading the product-related information provided on the tags;
   means for identifying at least one of a component to be assembled to the product or a process to be applied to the product by utilizing the product-related information;
   means for verifying that the product is located at a designated assembly station;
   means for verifying that at least one of an available component is the component designated by the product-related information or an available process is the process designated by the product-related information;
   means for updating the product-related information to indicate completion of a manufacturing operation comprising at least one of an assembly of the available component to the product or the application of the available process to the product;
   means for writing the updated product-related information to tags; and
   means for selectably assigning any of at least a sub-plurality of the tags not designated a primary tag for the manufacturing operation to be a primary tag that contains product-related information, read from more than one of the plurality of tags, for a subsequent manufacturing option.

7. The system according to claim 6 further comprising means for storing the product-related information.

8. The system according to claim 6 further comprising means for assembling the available component to the product.

9. The system according to claim 8, wherein the means for assembling the available component to the product is one or more pieces of automated equipment.

10. The system according to claim 6 further comprising means for applying the available process to the product.

11. The system according to claim 10, wherein the means for applying the available process to the product is one or more pieces of automated equipment.

12. The system according to claim 6 further comprising display means for displaying at least a portion of the product-related information.

13. The system according to claim 6 further comprising means for retrieving the available component.

14. The system according to claim 13, wherein means for retrieving the available component is selected from the group consisting of a conveyor system, an automated storage and retrieval system, a robotic arm, an automated guided vehicle, or a manual delivery system.

15. The system according to claim 14, wherein the manual delivery system is adapted to deliver the available component based on manual or automated signals.

16. The system according to claim 13 further comprising:
   data repository means for storing the product-related information; and
   means for transmitting the product-related information to the data repository means.

17. A method for manufacturing a product comprising:
   defining one or more assembly operations and one or more assembly components related to a manufacturing process as product-related information;
   securing a first tag to a first assembly component of the defined assembly components;
   writing at least a portion of the product-related information to the first tag;
   designating the first tag to be a primary tag used in a first assembly operation;
   reading at least a portion of the product-related information from the first tag, the read product-related information including the first assembly operation of the defined one or more assembly operations;
   determining whether the first assembly component is located at a designated assembly station identified by the first assembly operation;
   determining whether a component identifier read from the first tag as part of the product-related information corresponds to a child component to be assembled at the designated assembly station;
   assembling the child component to be assembled at the designated assembly station when the component identifier corresponds to the child component;
   switching primary tag designation from the first tag to a second separate tag secured to the first assembly component; and
   writing to the second tag updated production-related information comprising information contained on the first tag updated to indicate completion of a manufacturing operation performed during the assembly of the child component.

18. The method according to claim 17, wherein determining whether the component identifier read from the first tag as part of the product-related information corresponds to a child component comprises:
   reading a second component identifier from a second tag secured to the child component; and
   comparing the read component identifiers.

19. The method according to claim 17 further comprising:
   determining one or more processes related to the manufacturing process as product-related information;
   determining whether a first process identifier read from the first tag as part of the product-related information corresponds to a process to be applied at the designated assembly station;
   applying the process to be applied at the designated assembly station when the process identifier corresponds to the process; and
   updating the production-related information contained on the first tag to indicate application of the process, wherein determining whether a process identifier read from the first tag as part of the product-related information corresponds to a process to be applied at the designated assembly station comprises:
   receiving a second process identifier; and
   comparing the first and second process identifiers.

20. The method according to claim 17 further comprising transmitting the updated product-related information to a central data repository at some point during the manufacturing process of the product.

21. The method according to claim 17 further comprising:
   reading information provided on a second tag secured to the child component; and
   updating the product-related information contained on the first tag to include the information contained on the second tag secured to the child component.

22. An article of manufacture comprising non-transitory machine readable media storing instructions adapted to cause a processor to:
   receive one or more assembly operations and one or more assembly components related to a manufacturing process as product-related information;

write at least a portion of the product related information to a first tag secured to a first assembly component of the one or more of the assembly components;
designating the first tag to be a primary tag used in a first assembly operation;
read at least a portion of the product-related information from the first tag, the read product-related information including the first assembly operation of the received one or more assembly operations;
determine whether the first assembly component is located at a designated assembly station identified by the first assembly operation;
determine whether a component identifier read from the first tag as part of the product-related information corresponds to a child component to be assembled at the designated assembly station;
instruct an assembler to assemble the child component to be assembled at the designated assembly station when the component identifier corresponds to the child component;
switching primary tag designation from the first tag to a separate second tag secured to the first assembly component; and
write to the second tag updated production-related information comprising information contained on the first tag updated to indicate completion of a manufacturing operation performed during the assembly of the child component.

23. The article of manufacture according to claim 22, wherein instructions adapted to cause the processor to determine whether the assembly component to which the first tag is secured is located at a designated assembly station comprises instructions adapted to cause the processor to:
read a second component identifier from a second tag secured to the child component; and
compare first and second component identifiers.

24. The article of manufacture according to claim 22, wherein the instructions are further adapted to cause the processor to:
receive one or more processes related to a manufacturing process as product-related information;
determine whether a first process identifier read from the first tag as a part of the product-related information corresponds to a process to be applied at the designated assembly station;
instruct an assembly to apply the process to be applied at the designated assembly station when the process identifier corresponds to the process; and
update the product-related information contained on the first tag to indicate application of the process, wherein the instructions adapted to determine whether a first process identifier read from the first tag as part of the product-related information corresponds to a process to be applied at the designated assembly station comprises instructions adapted to cause the processor to:
receive a second process identifier; and
compare the first and second process identifiers.

25. The article of manufacture according to claim 22 further comprising instructions adapted to cause the processor to send the updated product-related information to a central data repository at some point during the manufacturing process of the product.

26. The article of manufacture according to claim 22 further comprising instructions adapted to cause the processor to:
read information provided on a second tag secured to the child component; and
update the product-related information contained on the first tag to include the information contained on the second tag secured to the child component.

* * * * *

UNITED STATES PATENT AND TRADEMARK OFFICE
CERTIFICATE OF CORRECTION

PATENT NO. : 8,930,010 B2  
APPLICATION NO. : 11/671358  
DATED : January 6, 2015  
INVENTOR(S) : Philip C. Hanses et al.

Page 1 of 1

It is certified that error appears in the above-identified patent and that said Letters Patent is hereby corrected as shown below:

In the Drawings,

In sheet 3 of 6, reference numeral 250, line 2, delete "Assamble" and insert -- Assemble --, therefor.

In the Claims,

In column 21, line 23, in Claim 6, delete "to" and insert -- to the --, therefor.

In column 21, line 29, in Claim 6, delete "option." and insert -- operation. --, therefor.

In column 22, line 19, in Claim 17, delete "second separate" and insert -- separate second --, therefor.

Signed and Sealed this  
Ninth Day of June, 2015

Michelle K. Lee  
*Director of the United States Patent and Trademark Office*